(12) United States Patent
Comberousse

(10) Patent No.: US 10,516,236 B2
(45) Date of Patent: Dec. 24, 2019

(54) CONNECTOR EQUIPPED WITH A LOCKING PART AND METHOD OF IMPLEMENTING THE CONNECTOR

(71) Applicant: ZODIAC INTERCONNECT UK LTD, Slough (GB)

(72) Inventor: Matthieu Comberousse, Slough (GB)

(73) Assignee: ZODIAC INTERCONNECT UK LTD, Slough (GB)

( * ) Notice: Subject to any disclaimer, the term of this patent is extended or adjusted under 35 U.S.C. 154(b) by 0 days.

(21) Appl. No.: 15/545,255

(22) PCT Filed: Jan. 20, 2016

(86) PCT No.: PCT/EP2016/051107
§ 371 (c)(1),
(2) Date: Jul. 20, 2017

(87) PCT Pub. No.: WO2016/116493
PCT Pub. Date: Jul. 28, 2016

(65) Prior Publication Data
US 2018/0006400 A1 Jan. 4, 2018

Related U.S. Application Data

(60) Provisional application No. 62/105,318, filed on Jan. 20, 2015.

(51) Int. Cl.
*H01R 13/639* (2006.01)
*H01R 4/00* (2006.01)
*H01R 13/627* (2006.01)
*F16B 21/18* (2006.01)
*H01R 101/00* (2006.01)

(52) U.S. Cl.
CPC ............ *H01R 13/639* (2013.01); *H01R 4/54* (2013.01); *H01R 13/6277* (2013.01); *F16B 21/186* (2013.01); *H01R 2101/00* (2013.01)

(58) Field of Classification Search
CPC ...... H01R 13/639; H01R 13/62; H01R 13/20; H01R 13/6397; F16L 37/144
See application file for complete search history.

(56) References Cited

U.S. PATENT DOCUMENTS 3,718,350 A * 2/1973 Klein .................... F16L 37/088
285/321
4,123,091 A * 10/1978 Cosentino ........... F16L 37/0847
285/307
4,244,608 A * 1/1981 Stuemky ............... F16L 37/144
24/545

(Continued)

*Primary Examiner* — Briggitte R. Hammond
(74) *Attorney, Agent, or Firm* — Christensen O'Connor Johnson Kindness PLLC

(57) ABSTRACT

Connector (1) comprising at least one female part (2) and at least one male part (3) engaging in the female part, and locking means (4) preventing any extraction of the male part from the female part, characterized in that the locking means comprise at least one removable locking part (4) arranged as an interface between the male part (3) and the female part (2), and the male and female parts comprise means of retention (24, 35) by mutual cooperation, the mutual disengaging of the retention means being rendered possible only after the withdrawal of the locking part.

15 Claims, 3 Drawing Sheets

(56) References Cited

U.S. PATENT DOCUMENTS

| | | | | |
|---|---|---|---|---|
| 4,266,814 A * | 5/1981 | Gallagher | F16L 37/091 | 285/319 |
| 5,366,259 A * | 11/1994 | Hohmann | F16L 37/107 | 285/23 |
| 5,482,480 A * | 1/1996 | Miyazaki | H01R 13/193 | 439/772 |
| 5,637,010 A * | 6/1997 | Jost | H01R 13/6277 | 439/352 |
| 5,735,716 A * | 4/1998 | Bilezikjian | H01R 13/187 | 439/843 |
| 5,964,484 A * | 10/1999 | Bartholomew | F16L 37/0987 | 285/308 |
| 5,984,378 A * | 11/1999 | Ostrander | F16L 37/0985 | 285/319 |
| 6,910,910 B2 * | 6/2005 | Cairns | G02B 6/3816 | 174/13 |
| 6,945,805 B1 * | 9/2005 | Bollinger | H01R 13/6276 | 439/348 |
| 7,287,994 B1 * | 10/2007 | Liao | H01R 13/6273 | 439/172 |
| 7,438,328 B2 * | 10/2008 | Mori | F16L 37/088 | 285/305 |
| 7,452,233 B1 * | 11/2008 | Michelsen | H01R 13/6273 | 439/369 |
| 7,758,371 B2 * | 7/2010 | Carmitchel | H01R 13/6392 | 439/363 |
| 7,845,685 B2 * | 12/2010 | Blivet | F16L 37/133 | 285/314 |
| 9,376,789 B2 * | 6/2016 | Li | E03C 1/021 | |
| 9,478,904 B2 * | 10/2016 | Ferry | H01R 13/6271 | |
| 9,845,908 B2 * | 12/2017 | Brunella | F16L 37/144 | |
| 2003/0137148 A1 * | 7/2003 | Andre | F16L 37/084 | 285/305 |
| 2007/0082532 A1 * | 4/2007 | Morris | H01R 13/629 | 439/352 |
| 2008/0166906 A1 * | 7/2008 | Nania | H01R 13/6271 | 439/345 |
| 2009/0246997 A1 * | 10/2009 | Moller | H01R 13/502 | 439/352 |
| 2010/0253073 A1 * | 10/2010 | Palmer | F16L 37/18 | 285/317 |
| 2011/0067225 A1 * | 3/2011 | Bassaco | F16D 25/08 | 29/525.01 |

\* cited by examiner

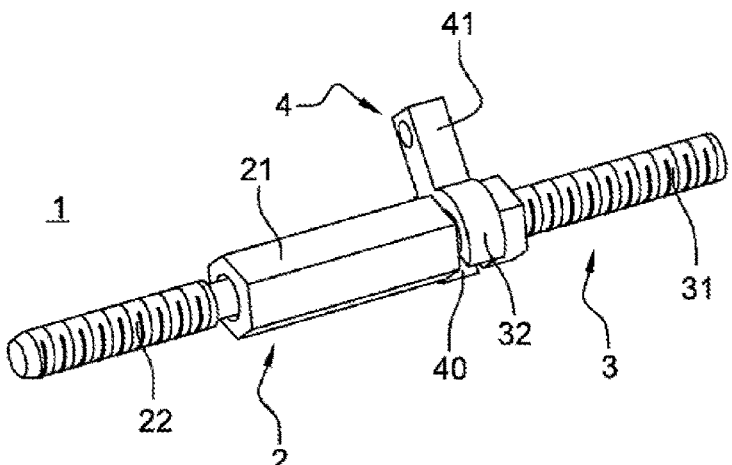
Fig. 1
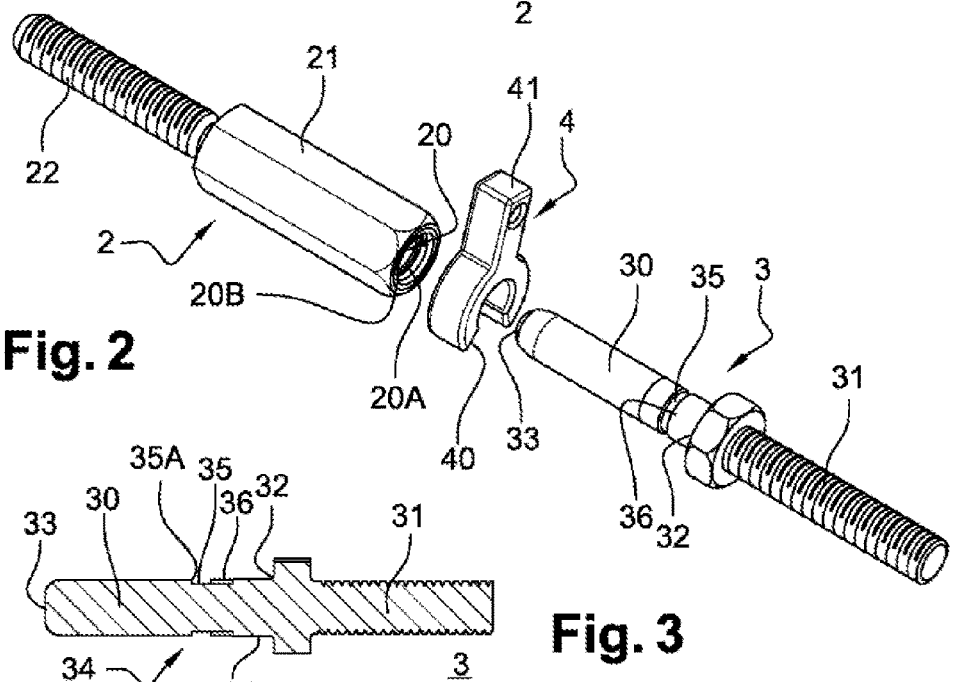
Fig. 2
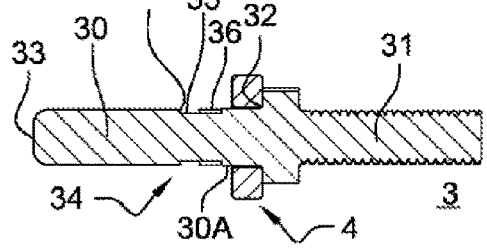
Fig. 3
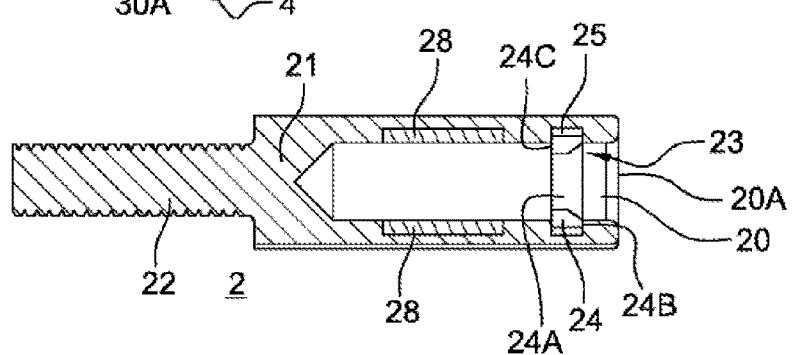
Fig. 4
Fig. 5

CONNECTOR EQUIPPED WITH A LOCKING PART AND METHOD OF IMPLEMENTING THE CONNECTOR

The invention concerns a connector comprising a female part and a male part engaging in the female part, and equipped with locking means preventing any extraction of the male part from the female part.

The invention concerns a connector for ensuring a mechanical and possibly an electrical connection. One application is for example the field of aeronautics, but without being limited to this.

One of the usual solutions employed in connectors, particularly electrical ones, is to make two parts cooperate mechanically, one of them being male and the other female, the parts being designed so that the electrical connection is effective after engagement of the male part in the female part. This solution is quick to put in place, the mechanical cooperation giving rise to the electrical connection. In order to ensure that the male part is properly engaged and that it cannot be extracted in untimely manner, the connector may furthermore comprise locking means, which need to be acted upon when a mechanical and thus electrical disconnection is required.

In certain applications, it is desirable to be able to easily ascertain that the locking means are effective.

Thus, the purpose of the invention is to provide a connector whose locking means may be visually identifiable when the male and female parts are cooperating to ensure a mechanical and possibly electrical connection if the connector is an electrical one, in order to guarantee the locked position of the connector, and which furthermore are simple and quick to put in place.

According to the invention, the connector comprising at least one female part and at least one male part engaging in the female part, and locking means preventing any untimely (or unwanted) extraction of the male part from the female part, is characterized in that the locking means comprise at least one removable locking part arranged as an interface between the male part and the female part, and the male and female parts comprise means of mechanical retention by mutual cooperation, the mutual disengaging of the means of retention being rendered possible only after the withdrawal of the locking part.

Thus, the locking part is sandwiched between the male and female parts, and the dissociation thereof is fast.

Preferably, the removable locking part is detachable from the connector by traction, in particular by a single traction gesture.

Consequently, the locking part when positioned as an interface makes it possible to prevent any disassembly of the connection part. It visually guarantees that the locking is operational and that the male and female parts cannot be disassembled inadvertently.

The locking part is an interface part serving as a brace between the male part and the female part to arrange an exterior space between the male part and the female part when the male part is in a position maintained in the female part and the locking part has been removed. This space corresponds to a portion of the travel for continuing the introducing of the male part into the female part, which is made possible after withdrawal of the locking part.

According to one characteristic, the locking part is mounted around the male part, having an annular shape.

The term annular means that the locking part surrounds the male part and is held by close contact around it.

Advantageously, the male part comprises a slender body having one free end designed to be introduced into the female part, and a proximal end having a shoulder, the locking part being disposed about the slender body and abutting against the shoulder.

In the position of assembly of the male part with the female part, the locking part is sandwiched between the shoulder of the male part and the peripheral edge of the female part considered around the opening/entrance of the female part.

The part is a snap-fit part. It is not necessarily associated with the male part by snapping (by elastic thrusting); it is preferably associated with it by translation, being inserted about the free end of the male part and slid as far as the proximal end of the body. On the other hand, it is dissociated from the male part by elastic traction.

The locking part is flexible, in particular, flexible and annular in shape, having a circumference partially open to ensure its detachment by traction.

The locking part thus has an orifice for passage of the body of the male portion of the connector and is partly closed at its circumference to ensure its being maintained on the male part while being able to be disengaged by traction in a direction perpendicular to the longitudinal axis of the slender body of the male part.

The material of the locking part has elastic properties and meets the constraints of aeronautics. As examples, in no way limiting, the material is chosen from among polymers such as polyester, polycarbonate, polysulfone, polyaryl ether ketone (PAEK), imides, especially polyether imide (PEI), etc., or among composites, or even among flexible metallic materials covered by an electrically insulating coating.

The locking part comprises a hollow internal cross section of geometry and dimension adapted to the external geometry and to the dimension of the portion of the body of the male part to which it is attached. The cross section may be circular, polygonal, complex with various shapes. The dimension of the internal cross section is adapted to the type of connector, for example, it may be between 2 mm and 30 mm.

The locking part comprises a means of grasping facilitating its being held, said means of grasping in particular forming a tab of radial direction projecting to the outside from the annular circumference.

The male and female parts comprise means of mechanical retention cooperating with each other.

The male and female parts may comprise means of mutual electrical connection.

The female part and the male part cooperate for their assembly by thrusting, and for their disassembly by thrusting and traction.

According to one preferred embodiment of the means of mechanical retention by mutual cooperation, the latter comprise on the one hand at least one projecting element, preferably a bushing, with respect to the internal wall of the interior seat of the female part receiving the male part, the element being retractable into the thickness of the wall, and on the other hand a peripheral groove devised in the body of the male part, the projecting element being designed to cooperate with the peripheral groove.

The projecting retention element is preferably in the form of a bushing lodged in the wall of the female part and having a slanting interior generatrix, the inclination being convergent from the wall of the female part in the direction of the interior of the seat toward the opposite side of its entrance.

The interior generatrix of the bushing defines a cross section narrowing from the near side of the entrance of the seat toward the opposite bottom.

In order to ensure the mobility of the bushing between a position partially emerging/projecting from the internal wall of the seat and a position retracted into the wall, the bushing is made of a flexible material (metal or plastic). The bushing is thus elastic so that it can move away when the body of the male portion is introduced.

Preferably, further, the peripheral groove of the male part comprises a ring (sliding) disposed around said groove and free in translation over the width of the groove. By the term "width" is meant in the following description the dimension extending in the direction of the longitudinal axis of the slender body of the male part designed to be introduced into the female part. The width of the ring is less than the width of the peripheral groove in order to allow its translation. The ring cooperates with the groove without passing radially beyond the body of the male part.

The female part comprises a seat to receive the male part, comprising an entrance from which the male part is designed to be introduced, a free space being reserved between the male part and the end of the seat opposite the entrance of the seat when the male part is in assembled position and maintained in the seat. The reserved space allows pushing the male portion further into the seat during the extraction of the male part by thrusting and traction.

The invention also pertains to a method of implementing the connector of the invention, characterized in that the locking part is positioned on the male part before the male part is completely introduced, preferably in advance before the start of the introduction, and the male part is introduced into the female part until the mutual cooperation of the means of retention occurs.

The steps of disassembly of the male and female parts involve the withdrawal of the locking part from the connector, preferably by a single traction gesture, the disengaging of the means of retention, preferably by a double action of thrusting and traction, and the extraction of the male part from the female part, in particular by traction.

The locking part may be removed with the aid of a tool or by hand, if it has an ergonomic part for its grasping.

The present invention shall now be described with the aid of examples, merely illustrative and in no way limiting of the scope of the invention, and starting with the appended illustrations, in which:

FIG. 1 represents a perspective view of the connector of the invention in a position of the male and female parts assembled and locked;

FIG. 2 is an exploded perspective view of the connector;

FIG. 3 is a longitudinal section view of the male part;

FIG. 4 is a cross section view of FIG. 3, the male part being provided with the locking part;

FIG. 5 is a longitudinal section view of the female part, the female part being furthermore provided with electrical contacts;

The device illustrated in the figures is a connector of the invention comprising a female part 2 and a male part 3 cooperating with the female part, and having a locking part 4, enabling a visualization of the mechanical assembly of the two parts and guaranteeing the locking, it not being possible to disassemble the two parts unless the locking part has been removed.

FIGS. 3 to 6 illustrate a connector of the invention with electrical connection function. The electrical connection function is assured when the connector is mechanically assembled, that is, when the male part 3 is lodged and maintained inside the female part 2, the two parts having electrical connection surfaces.

Figure 6:
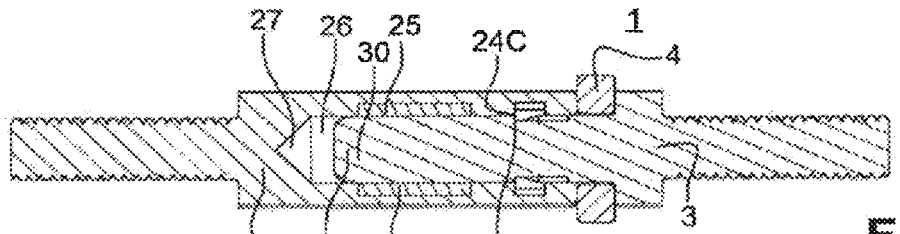
FIG. 6 is a view of the female part of FIG. 5 in which the male part of FIG. 4 is locked.
Figure 7:
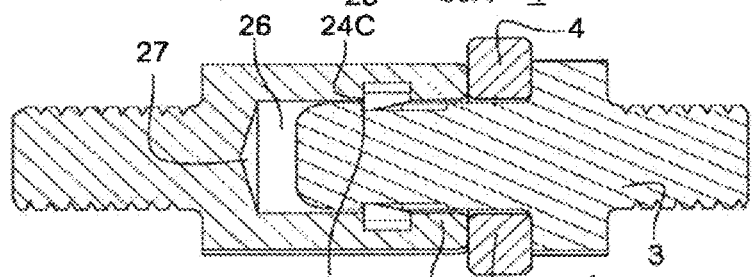
FIG. 7 is a cross section view of a connector of the invention without electrical contact and in assembled and locked position.

FIG. 7 illustrates a connector of the invention without electrical connection function. In fact, in other applications, a connector may need to mechanically join two elements without imposing an electrical connection.

The system of mechanical retention and locking of the connector is the same, regardless of whether or not an electrical connection is present. This system is described in the following.

The connector is designed to join two elements, not illustrated, on either side of each of the female and male parts, respectively.

Looking at FIGS. 1 and 2, the connector comprises the female part 2 in which is engaged the male part 3 and between which is disposed, as an interface, the locking part 4.

The external shapes of the parts are sample embodiments that are in no way limiting. Each male/female part of the connector according to its purpose will have a configuration adapted to its connection with the element for which it is intended. The dimensions of the connector are likewise adapted to its purpose and its use.

The female part 2 comprises a receiving seat 20, whereas the male part 3 comprises a body 30, being oblong here, which is adapted to being received in the seat 20. The dimensions and the geometrical shape of the seat and the body may vary. The shape of the male body here is cylindrical with a circular base, but it could have a polygonal cross section, for example, the seat having a complementary receiving shape.

The connector described below has only a single male body 30 and a single female receiving seat 20 for the male body. However, the system of retention and locking of the invention is applicable to a connector having several male bodies and several associated female seats, a locking system being provided for each pair of male body and female seat.

The male part 30 comprises the body 30, preferably oblong, and a collinear opposite portion 31 designed to be paired with an element to be connected, not shown. The portion 31 here is threaded as an example, in no way limiting. Furthermore, the male part comprises a shoulder 32 delimiting the body 30 with respect to the portion 31. The free end 33 of the body 30, opposite the shoulder 32, is designed to be engaged in the female part.

Moreover, the male part comprises means of retention 34 designed to cooperate mutually with means of retention 24 associated with the female part 2 to ensure the mechanical holding of the two parts once assembled.

The means of retention 34, 24 of the male and female parts are described below, in reference to FIGS. 3 and 4, as a preferred nevertheless in no way limiting example. The means of retention of the male and female parts advantageously constitute a push-pull type retention system.

The means of retention 34 of the male part 3 are devised between the free end 33 and the shoulder 32. They include a peripheral groove 35, thus devised in the thickness of the body 30 and around its perimeter, and a ring 36 fitted around over a portion of the width of the groove 35, while being free in longitudinal translation along the width of the groove. The sliding ring 36 surrounds the groove without projecting radially from the external wall 30A of the body 30.

When the connector of FIGS. 2 to 4 is used as an electrical connector (thus providing a mechanical and electrical connection), the body 30 and the portion 31 of the male part 3 are made of a metallic material, such as a copper-based alloy.

Even if the male portion 3 of the connector is made of an electrically conductive material, the male portion may still be used for an exclusively mechanical connection.

If the connector is designed solely to be used for a mechanical (and not an electrical) connection, the body of the male portion may be made of a material other than an electrically conductive material, such as a plastic.

The ring 36 is not necessarily metallic. For example, it is made of a plastic such as polyether ether ketone (PEEK) or polyoxymethylene (POM).

Looking at FIGS. 2 and 5, the female part 2 comprises the seat 20 arranged inside a body 21 and having an opening 20A, and a connection portion 22 extending opposite the opening 20A and designed to be paired with an element to be connected, not shown. The connection portion 22 here is threaded as an example that is in no way limiting.

The female part 2 comprises means of retention 23 designed to cooperate with the complementary means of retention 34 of the male part.

The means of retention 23 consist of an elastic bushing 24 lodged in a peripheral cavity 25 in the wall of the body 21 of the female part.

The elastic bushing 24 is made of a metallic material or a plastic material such as polyether ether ketone (PEEK) or polyoxymethylene (POM).

The bushing 24 is able to assume two positions, namely, a position of rest in which it projects into the seat 20 of the part (FIG. 5) and a retracted position (FIG. 8b) in which it is deformed/expanded/enlarged and occupies the entire receiving cavity 25 during the inserting of the male part.

The bushing 24 comprises a passage orifice 24A designed to be traversed by the body 30 of the male part 3.

The orifice 24A has an interior profile whose cross section varies in decreasing manner from the front edge 24B situated on the side with the opening 20A to the opposite rear edge 24C. Thus, the interior surface of the bushing 24 is conical. The interior generatrix of the bushing has an inclination converging from the edge 24B designed to cooperate first with the body 30 of the male part, in the direction of the opposite edge 24C.

Once the body 30 of the male part has been introduced through the bushing 24, such as will be explained further below, the bushing 24 is designed to cooperate by engagement with the peripheral groove 35 (FIGS. 6, 7 and 8c), the edge 24C abutting against one of the lateral faces 35A of the groove 35. This mutual cooperation ensures the retention of the male part in the female part.

The seat 20 has a volume suited to the lodging of the body 30 and to arranging a free space 26 (FIGS. 6 and 7) between the free end 33 of the body 30 when the latter is in a position retained in the seat, and the bottom 27 of the seat opposite the opening 20A. This space 26 has a width at least equal to half the width of the ring 36 of the male part 3.

When the connector 1 is an electrical connector, the female part 2 is made of a metallic material, the body 21 and the portion 22 being metallic. Moreover, in order to guarantee electrical continuity between the body 30 and the body 21 in the area of the seat 20, the female part 2 comprises (FIGS. 5 and 6) electrical contacts 28 arranged in the seat 20 against the internal wall of the seat 20 of the body 21 and designed to be in close contact with the body 30 of the male part (on the side with the free end 33) once it has been engaged and retained.

In the example of FIG. 7, the connector not being a connector of electrical connection, the seat 20 is lacking in electrical contacts.

Finally, the connector 1 of the invention comprises the locking part 4. This locking part makes it possible, once the male part 3 is engaged in the female part 2 and maintained therein thanks to the means of retention 24 and 34, to visually notice that the male and female parts are engaged and to prevent any inadvertent dissociation of the two parts.

The locking part 4 is preferably put in place on the male portion 3 before introducing the latter into the female portion.

The locking part 4 is an interface part serving as a brace between the male part 3 and the female part 2.

The locking part 4 comprises a portion forming a ring, at least substantially of U shape (FIGS. 1 and 2), so as to cooperate with the body 30.

The term ring for the locking part 4 does not necessarily mean a circular shape. The locking part surrounds the body 30 and comprises an internal cross section adapted to the exterior shape of the body 30.

In the preferred variant of the invention, the locking part 4 is a part of flexible material and has the shape of a ring open on a portion 40 of its periphery. It is flexible and partly open to allow its decoupling from the body 30.

The locking part 4 is designed to be clamped around the body 30 of the male part by contact with the wall 30A while abutting against the shoulder 32 (FIG. 4). It is disposed between the shoulder 32 and the peripheral groove 35.

The locking part 4 is associated with the body 30 of the male part in the manner of a clip.

The elastic property of the material forming the open ring enables its easy and quick removal from the body 30 as a snap-fitted part which one wishes to decouple.

However, other variants may be contemplated. For example, the locking part might be made of two portions defining a closed line (and not partly opened), coupled between themselves on the one hand by a hinge and on the other hand by a means of quick fixation of the snap type or any other system of removable yet reliable connection of the two ends. In yet another example, the locking part might be made of two half-shells which are assembled in removable manner, for example by snapping, and forming a closed line once assembled.

Advantageously, the locking part 4 comprises a radial grasping portion 41, projecting from the open ring portion 40 of said part 4 and from the rest of the connector in order to be easily grasped by hand so as to be pulled.

The implementing of the connector of the invention shall now be described in regard to FIGS. 8a to 9c, the connector being the one of FIG. 7.

Before the engaging of the male part 3 in the female part 2, the user puts in place the open ring 40 of the locking part 4 on the male part (FIG. 8a), for example, by threading it around the body 30 until it abuts against the shoulder 32. It could also be positioned by snapping.

Figure 8A:
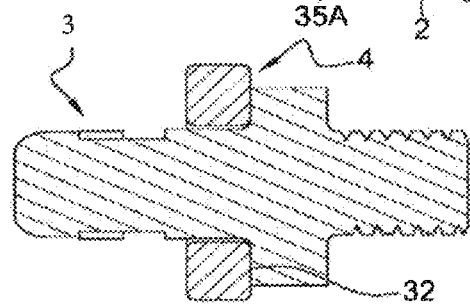
FIGS. 8a to 8c show cross section views of the steps of assembly of the male part in the female part of the connector of FIG. 7, FIG. 8c corresponding to the connector in locked position of FIG. 7.

The assembly of the two female 2 and male 3 parts of the connector is done as follows, looking at FIGS. 8*a* to 8*c*.

Figure 8B:
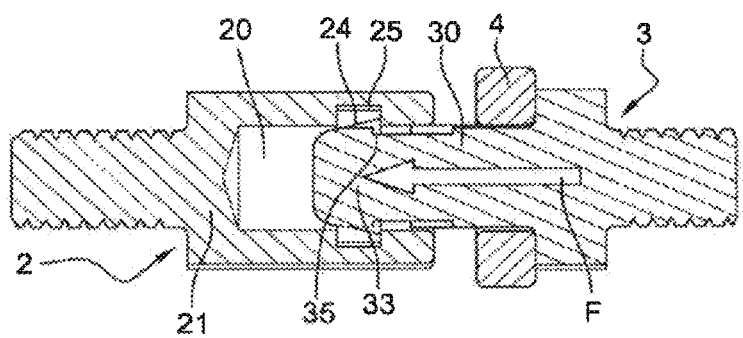
Figure 8C:
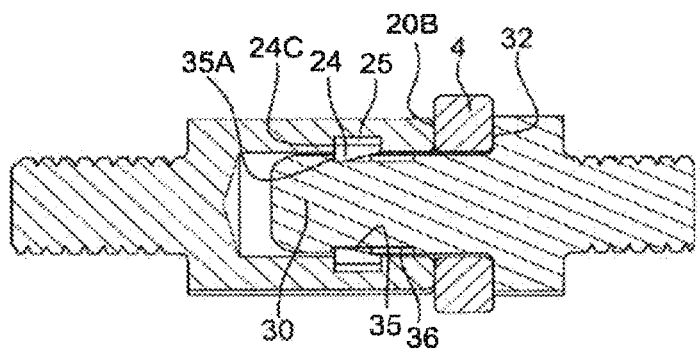

Looking at FIG. 8*b*, once the locking part 4 is in place, one introduces the male part 3 in translation along the arrow F into the seat 20. The end 33 of the male part abuts against the bushing 24 of the female part 2; thanks to the convergent inclination of the interior profile of the bushing 24, while continuing to push along the arrow F, the body 30 continues to advance, pushing the bushing 24 into the cavity 25.

The pushing is continued until the groove 35 of the male part (FIG. 8*c*) encounters the bushing 24 which, returning by elasticity to its original shape, is placed inside the groove without being able to leave. The assembly of the male part with the female part is now complete. The locking part 4 is thus sandwiched between the shoulder 32 of the male part 3 and the free end or edge 20B of the female part 2, coplanar with the opening 20A.

The connector is thus assembled and locked. Any traction in the direction opposite the arrow F is impossible, the lateral face 35A of the groove 35 abutting against the edge 24C of the bushing. Moreover, since the retention system is a system of push-pull type, and since it is necessary to first perform a pushing action in order to extract the male connector, the presence of the brace produced by the locking part 4 renders this action impossible.

The dissociation of the two parts of the connector is done as follows.

Figure 9A:
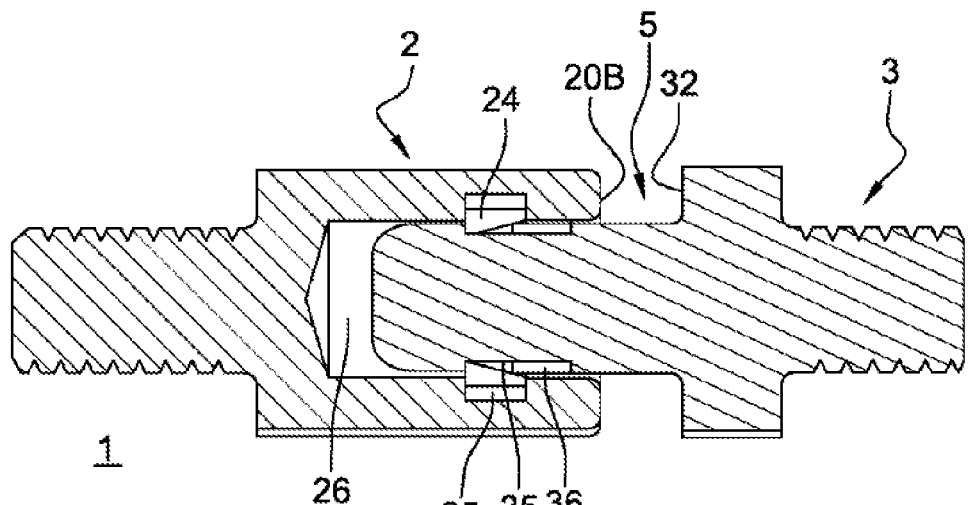
FIGS. 9a to 9c are cross section views of the steps of disassembly of the male part from the female part, starting with the connector of FIG. 8c.
Figure 9B:
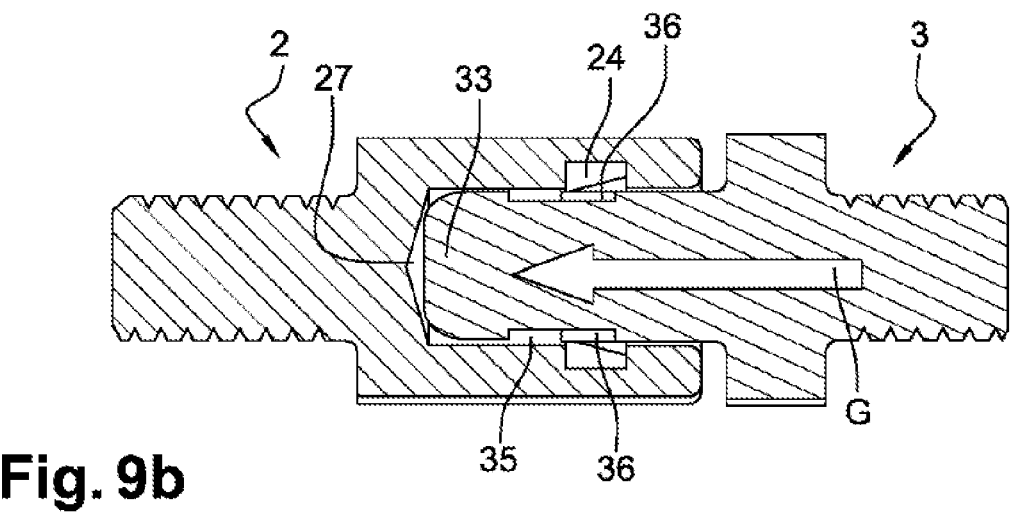
Figure 9C:
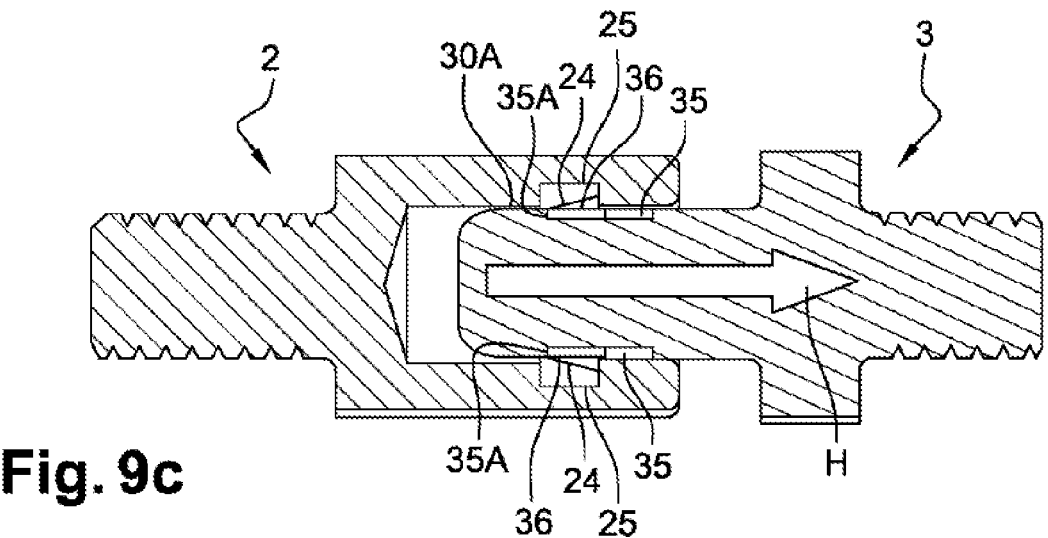

The user pulls on the projecting portion 41 of the locking part 4 causing a moving apart of the two tabs of the ring open at 40, and thus enabling the disengaging of the part 4 of the connector 1. As can be seen in FIG. 9*a*, the male part 3 is still maintained and retained in the female part 2, an exterior free space 5 being arranged between the two male and female parts in the location of the locking part.

The locking part 4 being removed, it is then possible to push on the male part, the brace 4 giving way to an exterior space between the two parts whose width is at least equal to the portion of the travel needed for the supplemental introduction of the male portion in the female portion. By pushing in translation along the arrow G, looking at FIG. 9*b*, the body 30 can continue its introduction thanks to the ring 36 lodged in the groove 35, the ring 36 pushing in turn on the inclined interior profile of the bushing 24 of the female part. The space 26 reserved in the seat 20 allows the body 30 to be pressed into it. When the end 33 of the body 30 arrives in abutment against the bottom 27 of the seat 20, the user exerts a traction along the arrow H of FIG. 9*c* in the opposite direction to the pushing.

The extraction of the body 30 is made possible by the mobility in translation of the sliding ring 36 in the groove 35 of the male part 3:

after having fully pressed the male part 3 into the female part 2 (FIG. 9*b*), the sliding ring 36 of the male part is positioned opposite the elastic bushing 24 of the female part;

by pulling on the male part 3, the ring 36 being free in translation slides concomitantly in the groove 35 while remaining continually opposite the bushing 24 (FIG. 9*c*) which is thus kept away in the cavity 25 of the wall;

the ring 36 slides and abuts against the lateral face 35A of the groove (FIG. 9*c*), then when the traction continues the bushing 24 encounters the external surface 30A of the body 30, making possible the sliding and the total extraction of the body 30 from the seat 20.

The invention claimed is:

1. A connector comprising: at least one female part and at least one male part engaging in the female part, and locking means preventing inadvertent dissociation of the male part from the female part, wherein the locking means comprise at least one removable locking part arranged as an interface between the male part and the female part, and the male and female parts comprise means of retention by mutual cooperation, a mutual disengaging of the means of retention being rendered possible only after a withdrawal of the removable locking part, wherein the means of retention by mutual cooperation comprise at least one bushing with respect to an internal wall of an interior seat of the female part receiving the male part, the at least one bushing being retractable into a thickness of the internal wall, and a peripheral groove devised in a body of the male part, the at least one bushing being designed to cooperate with the peripheral groove.

2. The connector as claimed in claim 1, wherein the removable locking part is sandwiched between the male and female parts, the removable locking part being detachable from the connector by traction.

3. The connector as claimed in claim 1, wherein the removable locking part is mounted around the male part, has an annular shape, is flexible, and has a partially open circumference.

4. The connector as claimed in claim 1, wherein the removable locking part comprises a hollow internal cross section of geometry and dimension adapted to an external geometry and to a dimension of a portion of a body of the male part to which the removable locking part is attached.

5. The connector as claimed in claim 1, wherein the removable locking part is of annular shape and comprises a means of grasping, the means of grasping being a tab projecting radially outwardly from an annular circumference.

6. The connector as claimed in claim 1, wherein the removable locking part braces between the male part and the female part to arrange an exterior space between the male part and the female part when the male part is in the female part.

7. The connector as claimed in claim 1, wherein the female and male parts comprise means of mutual electrical connection.

8. The connector as claimed in claim 1, wherein the female part and the male part cooperate for their assembly by thrusting, and for their disassembly by thrusting and traction.

9. The connector as claimed in claim 1, wherein a projecting element is in a form of a bushing lodged in the internal wall of the female part and having an interior generatrix whose cross section narrows from a near side of an entrance of an interior seat toward an opposite bottom.

10. The connector as claimed in claim 1, wherein the at least one bushing is made of a flexible material, the at least one bushing being able to be moved away when the body of the male part is introduced between a position partially emerging from the internal wall of the female part and a position retracted into the internal wall of the female part.

11. The connector as claimed in claim 1, wherein the peripheral groove of the male part comprises a ring disposed around said peripheral groove and free in translation over a width of the peripheral groove.

12. The connector as claimed in claim 1, wherein the female part comprises a seat to receive the male part, comprising an entrance from which the male part is designed to be introduced, a free space being reserved between the male part and an end of the seat opposite the entrance of the seat when the male part is in assembled position and maintained in the seat.

13. A method of implementing a connector as claimed in claim 1, comprising:
  positioning the removable locking part on the male part before the male part is introduced into the female part; and
  introducing the male part into the female part until the means of retention mutually cooperate to retain the male and female parts.

14. The method of claim 13, further comprising disassembling the male and female parts by withdrawing the removable locking part from the connector, disengaging the means of retention, and extracting the male part from the female part by traction.

15. A method of implementing a connector comprising a female part and a male part engaging in the female part, and locking means preventing inadvertent dissociation of the male part from the female part, wherein the locking means comprise a removable locking part arranged as an interface between the male part and the female part, and the male and female parts comprise means of retention by mutual cooperation, a mutual disengaging of the means of retention being rendered possible only after a withdrawal of the removable locking part, the method comprising:
  positioning the removable locking part on the male part before the male part is introduced into the female part; and
  introducing the male part into the female part until the means of retention mutually cooperate to retain the male and female parts.

* * * * *